US010315475B2

(12) United States Patent
Yatsunami et al.

(10) Patent No.: US 10,315,475 B2
(45) Date of Patent: Jun. 11, 2019

(54) TOWING HOOK ATTACHMENT STRUCTURE

(71) Applicants: AISIN SEIKI KABUSHISIKI KAISHA, Kariya-shi, Aichi-ken (JP); AISIN KEIKINZOKU KABUSHIKI KAISHA, Imizu-shi, Toyama-ken (JP)

(72) Inventors: Hiroyuki Yatsunami, Obu (JP); Kiyoichi Kita, Okazaki (JP); Jun Shobo, Anjo (JP); Yohei Kanatani, Chiryu (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 53 days.

(21) Appl. No.: 15/676,096

(22) Filed: Aug. 14, 2017

(65) Prior Publication Data
US 2018/0072119 A1    Mar. 15, 2018

(30) Foreign Application Priority Data
Sep. 15, 2016    (JP) .................................. 2016-180500

(51) Int. Cl.
*B60D 1/56*      (2006.01)
*B60R 19/48*     (2006.01)
(Continued)

(52) U.S. Cl.
CPC ............ *B60D 1/565* (2013.01); *B60R 19/023* (2013.01); *B60R 19/48* (2013.01); *B62D 25/209* (2013.01); *B60D 1/56* (2013.01); *B60R 19/02* (2013.01)

(58) Field of Classification Search
CPC ........ B60D 1/565; B60D 1/56; B60R 19/023; B60R 19/02; B60R 19/48; B62D 25/209
See application file for complete search history.

(56) References Cited

U.S. PATENT DOCUMENTS

| 5,716,066 A | * | 2/1998 | Chou | ..................... B60D 1/488 |
| | | | | 280/460.1 |
| 6,604,884 B1 | * | 8/2003 | Ohkura | ..................... B60D 1/56 |
| | | | | 403/187 |

(Continued)

FOREIGN PATENT DOCUMENTS

| JP | 3328237 | 9/2002 |
| JP | 4229388 | 2/2009 |
| JP | 4860374 | 1/2012 |

*Primary Examiner* — Anne Marie M Boehler
*Assistant Examiner* — Marlon A Arce
(74) *Attorney, Agent, or Firm* — Finnegan, Henderson, Farabow, Garrett & Dunner, LLP

(57) ABSTRACT

A towing hook attachment structure includes: a towing hook; a bumper reinforcement having: a first wall extending in a vehicle width direction, a wall surface of the first wall facing the vehicle cabin; and an second wall and a third wall respectively extending to the vehicle cabin side from an upper end and a lower end of the first wall; and a nut member fastening the towing hook to the bumper reinforcement. The first, second and third walls are respectively provided with a first, second and third holes. The nut member is fixed to the bumper reinforcement while extending in a vehicle height direction and being inserted in the second hole and the third hole. A tip of the towing hook is inserted in the bumper reinforcement through the through hole and is fastened to the nut member.

6 Claims, 4 Drawing Sheets

(51) Int. Cl.
*B62D 25/20* (2006.01)
*B60R 19/02* (2006.01)

(56) References Cited

U.S. PATENT DOCUMENTS

| | | | |
|---|---|---|---|
| 8,308,184 B2 | 11/2012 | Hodoya et al. | |
| 8,419,040 B2* | 4/2013 | Ando | B60D 1/04 280/491.5 |
| 10,065,468 B2* | 9/2018 | Virupaksha | B60R 19/34 |
| 2003/0034661 A1* | 2/2003 | Gotanda | B60R 19/24 293/155 |
| 2004/0135382 A1* | 7/2004 | Sakuma | B60R 19/34 293/102 |
| 2005/0236809 A1* | 10/2005 | Haneda | B60D 1/56 280/495 |
| 2008/0001383 A1* | 1/2008 | Hodoya | B60D 1/56 280/477 |
| 2012/0228889 A1* | 9/2012 | Haneda | B60R 19/12 293/132 |
| 2015/0048635 A1* | 2/2015 | Ishitobi | B60D 1/565 293/117 |

* cited by examiner

TOWING HOOK ATTACHMENT STRUCTURE

INCORPORATION BY REFERENCE

The disclosure of Japanese Patent Application No. 2016-180500 filed on Sep. 15, 2016 including the specification, drawings and abstract is incorporated herein by reference in its entirety.

BACKGROUND

1. Technical Field

The disclosure relates to a towing hook attachment structure for a vehicle.

2. Description of Related Art

As described in Japanese Patent No. 4229388, a towing hook that is fastened to a bumper reinforcement of a vehicle has been known. This bumper reinforcement is formed in a cylindrical shape that extends in a vehicle width direction on a front side (or a rear side) of a vehicle cabin. A cross-sectional outer shape of this bumper reinforcement that is perpendicular to a longitudinal direction thereof is rectangular. That is, the bumper reinforcement has a front wall, a rear wall, an upper wall, and a lower wall. The front wall and the rear wall are parallel with each other in a vehicle height direction. The upper wall and the lower wall are perpendicular to the vehicle height direction. The upper wall connects an upper end of the front wall and an upper end of the rear wall. The lower wall connects a lower end of the front wall and a lower end of the rear wall. The front wall and the rear wall are each formed with a through hole that passes through the front and rear walls in a vehicle longitudinal direction, and a nut member is inserted in this through hole. The nut member extends in the vehicle longitudinal direction. A front end of the nut member protrudes to the front from a front surface of the front wall. A rear end of the nut member protrudes to the rear from a rear surface of the rear wall. The front end of the nut member is fixed to the front surface of the front wall, and the rear end of the nut member is fixed to the rear surface of the rear wall. The towing hook is fastened to the nut member. The bumper reinforcement is attached to a framework member (a side member, a subframe, or the like) of the vehicle.

SUMMARY

In Japanese Patent No. 4229388, the nut member protrudes to the vehicle cabin side from the bumper reinforcement. For this reason, an attachment position of the towing hook has to be set at a position where the nut member does not interfere with the framework member and other components of the vehicle. In the case where the attachment position of the towing hook can only be set at such a position that the nut member interferes with the framework member due to design restriction of the vehicle, restriction by arrangement of the other components, or the like, the framework member has to adopt a structure (a recess, a hole, or the like) of avoiding the nut member.

The disclosure provides a towing hook attachment structure capable of improving freedom in design of a vehicle.

An aspect of the disclosure is a towing hook attachment structure that includes: a towing hook of a vehicle; a bumper reinforcement having: a first wall that is disposed in front of or behind a vehicle cabin and extends in a vehicle width direction, a wall surface of the first wall facing the vehicle cabin; and a second wall and a third wall that respectively extend to the vehicle cabin side from an upper end and a lower end of the first wall; and a nut member that fastens the towing hook to the bumper reinforcement. The first wall, the second wall, and the third wall are respectively provided with a first through hole, a second through hole, and a third through hole. The nut member is fixed to the bumper reinforcement while extending in a vehicle height direction and being inserted in the second through hole and the third through hole. A tip of the towing hook is inserted in the bumper reinforcement through the first through hole and is fastened to the nut member.

In this case, the third through hole may be larger than the second through hole. The nut member may be inserted in the second through hole from a position above the second wall and may be fixed to the bumper reinforcement in a state where a tip thereof protrudes from the third through hole.

In this case, an upper end and a lower end of the nut member may respectively be welded to the second wall and the third wall.

In the towing hook attachment structure according to the embodiment of the disclosure, the nut member, to which the towing hook is fastened, extends in the vehicle height direction. Then, the nut member is inserted in the second through hole and the third through hole, which are respectively provided in the second wall and the third wall of the bumper reinforcement, and is fixed to the second wall and the third wall. Accordingly, even when the upper end and the lower end of the nut member respectively protrude more or less from an upper surface and a lower surface of the bumper reinforcement, the nut member does not protrude to the vehicle cabin side from the bumper reinforcement. In addition, the towing hook is inserted in the bumper reinforcement through the first through hole provided in the first wall, and is fastened to the nut member. When length of a portion of the towing hook that is fastened to the nut member (length of a male screw) is set to be the same as thickness of the nut member, the towing hook does not protrude to the vehicle cabin side from the bumper reinforcement. Accordingly, a framework member of the vehicle does not have to be provided with a recess, a hole, or the like used to avoid the nut member and the towing hook. In addition, an attachment position of the towing hook can be set without being restricted by a position of the framework member of the vehicle. Just as described, according to the towing hook attachment structure according to this embodiment, freedom in design of the vehicle can be improved.

Like the towing hook attachment structure disclosed in Japanese Patent No. 4229388, in the cases where the nut member extends in the vehicle longitudinal direction and the nut member is supported by the first wall, a towing load (a load in the vehicle longitudinal direction that is applied to the towing hook) is directly applied to the first wall, and is applied to the second wall and the third wall via the first wall. In this case, the second wall and the third wall function as ribs of the first wall. However, the first wall is possibly deformed before the second wall and the third wall are deformed by the excess towing load. On the contrary, in this embodiment, the towing load is directly applied to the second wall and the third wall. Thus, according to this embodiment, compared to the towing hook attachment structure disclosed in Japanese Patent No. 4229388, the maximum towing load can be set to be large.

In addition, the bumper reinforcement has a function of being compressed and deformed in the vehicle longitudinal direction by a shock load during a collision and absorbing a shock by the collision. Here, like Japanese Patent No. 4229388, in the cases where the nut member extends in the vehicle longitudinal direction in a manner to run across the front end to the rear end of the bumper reinforcement, rigidity of a portion of the bumper reinforcement provided with the nut member against a rear (or front) collision is higher than rigidity of the other portions. Accordingly, deformation of the portion of the bumper reinforcement provided with the nut member is suppressed, and thus the shock cannot efficiently be absorbed. On the contrary, in this embodiment, portions of the bumper reinforcement in front of and at the rear of the nut member can be formed with spaces. Accordingly, when the object collides with the vehicle from the rear (or the front), the portions of the bumper reinforcement in front of and behind the nut member are compressed and deformed. In this way, the shock by the collision is absorbed.

In the above embodiment, the nut member may be arranged at an end of the bumper reinforcement on the vehicle cabin side.

When the load in the vehicle height direction or the vehicle width direction is applied to the towing hook in a state where the towing hook is fastened to the nut member, the towing hook oscillates more or less in a direction of the load. When the towing hook abuts against an inner peripheral surface of the first through hole, oscillation of the towing hook is restricted. In this embodiment, the nut member is arranged at the end of the bumper reinforcement on the vehicle cabin side. Accordingly, in the state where the towing hook is fastened to the nut member, a distance between the nut member, which supports the towing hook, and the first through hole can be set to be relatively long. Thus, compared to a case where the nut member is arranged at an end of the bumper reinforcement on an opposite side from the vehicle cabin (near the first through hole), an oscillation angle of the towing hook in a state where the oscillation of the towing hook is restricted is small.

Note that a position of the nut member in the vehicle longitudinal direction (that is, positions of the second through hole and the third through hole in the vehicle longitudinal direction) may be set in accordance with a distance between the bumper reinforcement and a bumper cover. For example, in a vehicle type with the relatively long distance, the nut member is set at a position near the first wall. Meanwhile, in a vehicle type with the relatively short distance, the nut member is set at a position far from the first wall. According to this, even when the same towing hook is adopted as a common part for the plural vehicle types with the different distances, a protrusion amount of the towing hook from the bumper cover can be set to be the same for the plural vehicle types.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
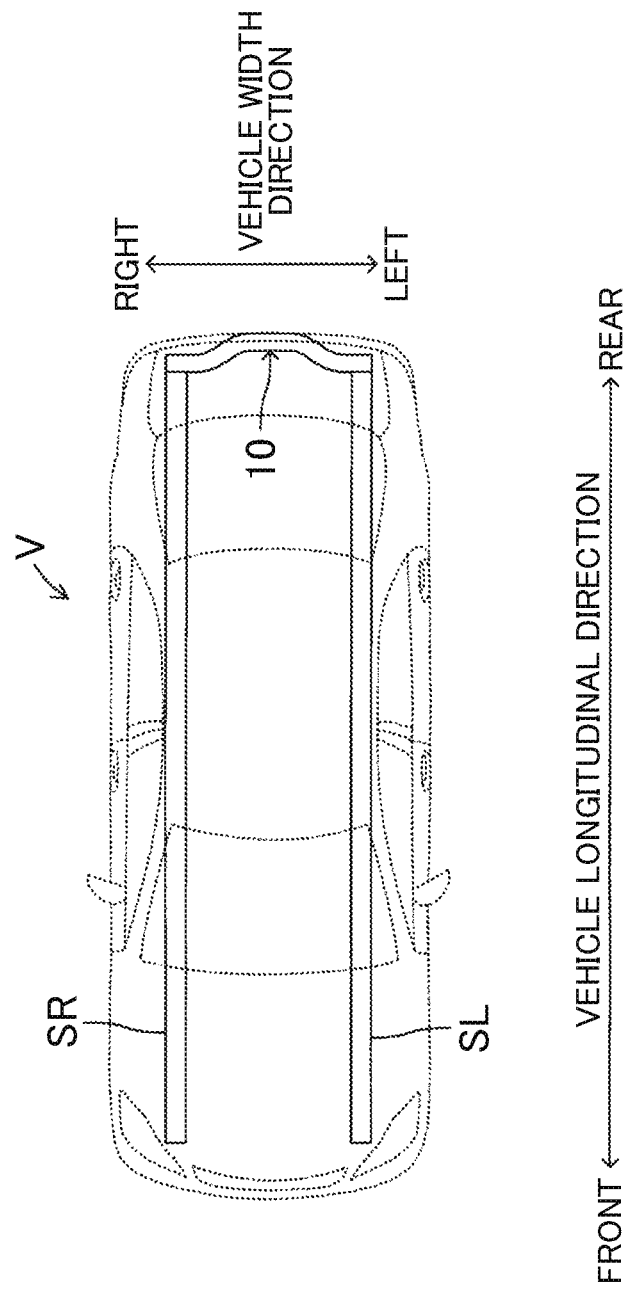
FIG. 1 is a plan view that schematically shows a vehicle, to which a towing hook attachment structure according to one embodiment of the disclosure is applied.

A description will be made on a towing hook attachment structure 1 according to one embodiment of the disclosure. First, a configuration of a vehicle V, to which the towing hook attachment structure 1 is applied, will briefly be described. As shown in FIG. 1, this vehicle V has side members SR, SL. The side members SR, SL are arranged to have a space therebetween in a vehicle width direction, and each extend in a vehicle longitudinal direction. Each of the side members SR, SL is formed in a square tube shape, and a rear end surface thereof is closed by a rear wall. A rear end surface of this rear wall is formed in a planar shape that is perpendicular to the vehicle longitudinal direction.

Figure 2:
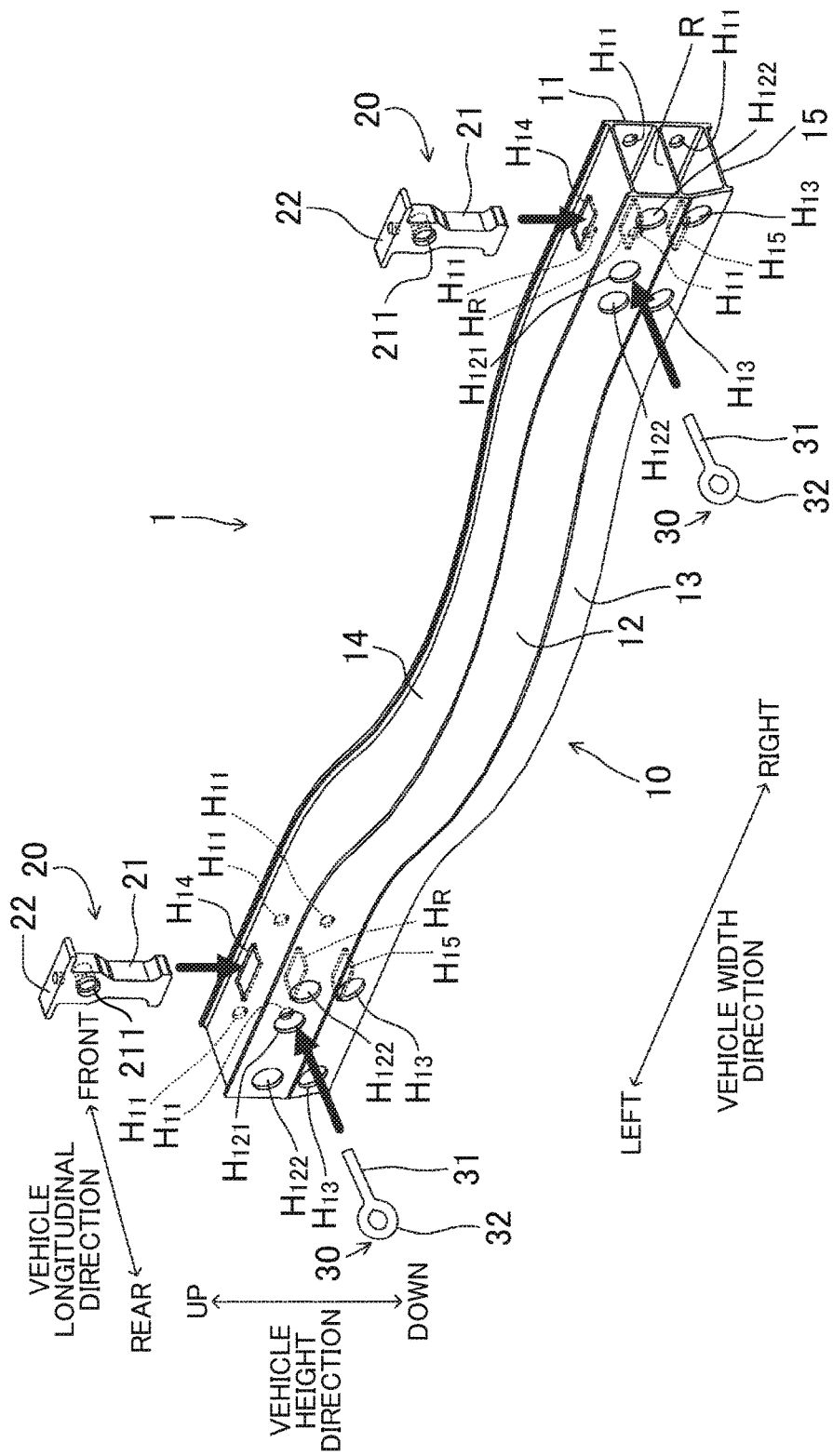
FIG. 2 is an exploded perspective view of the towing hook attachment structure according to the one embodiment of the disclosure.

Next, a description will be made on an outline of the towing hook attachment structure 1. As shown in FIG. 2, in this embodiment, a nut member 20 is inserted in each through hole provided in a bumper reinforcement 10, that is, a through hole $H_{14}$, a through hole $H_R$, and a through hole $H_{15}$ that pass through the bumper reinforcement 10 in a vehicle height direction. Then, a towing hook 30 is fastened to the nut member 20. Note that, while a description will be made on a structure of attaching the towing hook 30 to a rear end of the vehicle V in this embodiment, the disclosure can also be implemented as a structure of attaching the towing hook 30 to a front end of the vehicle V. In addition, in the towing hook attachment structure 1, a structure of a left end thereof is symmetrical to a structure of a right end thereof. Thus, a description thereon will appropriately be omitted.

Figure 3:
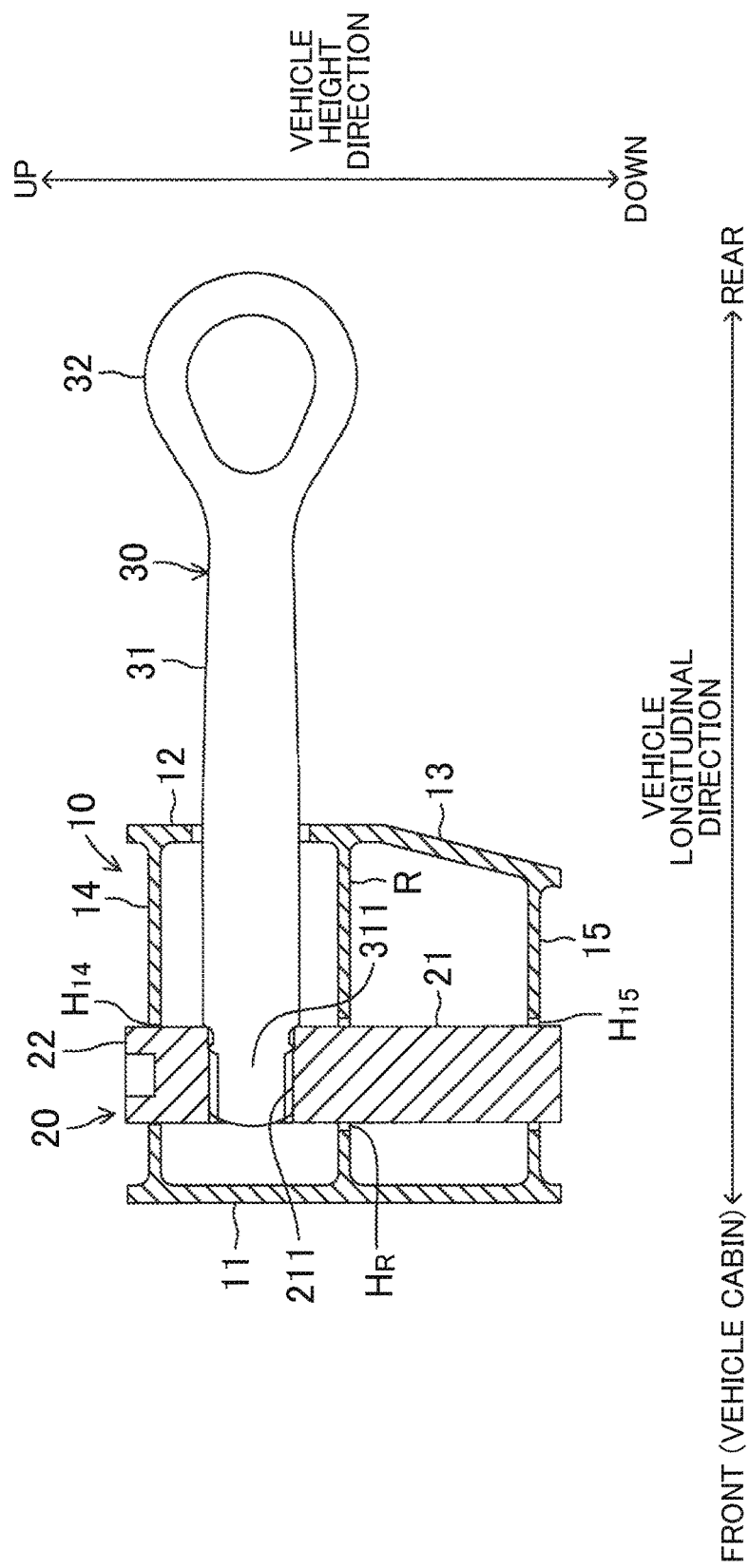
FIG. 3 is a cross-sectional view of a portion, in which a towing hook and a nut member are arranged, at an end of a bumper reinforcement that is perpendicular to a longitudinal direction thereof, and is a cross-sectional view of a central section in a vehicle width direction.

A detailed description will hereinafter be made on configurations of the bumper reinforcement 10, the nut member 20, and the towing hook 30. The bumper reinforcement 10 extends in the vehicle width direction, and both ends of a front surface thereof in the vehicle width direction are respectively fastened to rear end surfaces of the rear walls of the side members SR, SL. As shown in FIG. 2 and FIG. 3, the bumper reinforcement 10 is formed in a tubular shape that extends in the vehicle width direction. A central section of the bumper reinforcement 10 in the vehicle width direction is formed to be curved in a manner to follow a bumper cover of the vehicle V. That is, in a plan view of the bumper reinforcement 10, the central section of the bumper reinforcement 10 in the vehicle width direction is curved to be located at the rear from both ends in the vehicle width direction. Each of the ends of the bumper reinforcement 10 in the vehicle width direction extends in a linear shape that is parallel with the vehicle width direction.

As shown in FIG. 3, a cross-sectional outer shape of the bumper reinforcement 10 that is perpendicular to an extending direction is substantially pentagonal. That is, the bumper reinforcement 10 has a front wall 11, an upper rear wall 12, a lower rear wall 13, an upper wall 14, and a lower wall 15. The upper rear wall 12 and the lower rear wall 13 are located at the rear of the front wall 11. A wall surface (a front surface) of the front wall 11 faces a vehicle cabin side, and wall surfaces (rear surfaces) of the upper rear wall 12 and the lower rear wall 13 face an opposite side from the vehicle cabin. The front wall 11 and the upper rear wall 12 are parallel with each other in the vehicle height direction. The lower rear wall 13 is located below the upper rear wall 12. An upper end of the lower rear wall 13 is connected to a lower end of the upper rear wall 12. The lower rear wall 13 is slightly inclined with respect to the vehicle height direction. More specifically, a lower end of the lower rear wall 13 is located slightly to the front from the upper end thereof. Note that the upper rear wall 12 and the lower rear wall 13 are an example of the first wall of the disclosure.

The upper wall 14 and the lower wall 15 are each arranged perpendicularly to the vehicle height direction (that is, an upper surface and a lower surface of each thereof are horizontal). A front end of the upper wall 14 is connected to an upper end of the front wall 11, and a rear end of the upper wall 14 is connected to an upper end of the upper rear wall 12. That is, the upper wall 14 extends from the upper end of the upper rear wall 12 to the vehicle cabin side. A front end of the lower wall 15 is connected to a lower end of the front wall 11, and a rear end of the lower wall 15 is connected to the lower end of the lower rear wall 13. That is, the lower wall 15 extends from the lower end of the lower rear wall 13 to the vehicle cabin side. Note that the upper wall 14 is an example of the second wall of the disclosure, and the lower wall 15 is an example of the third wall of the disclosure.

A rib R is formed in a space that is surrounded by the front wall 11, the upper rear wall 12, the lower rear wall 13, the upper wall 14, and the lower wall 15. The rib R extends to the front from a connection section between the upper rear wall 12 and the lower rear wall 13 and is connected to a central section of the front wall 11 in the vehicle height direction.

The through hole $H_{14}$, the through hole $H_R$, and the through hole $H_{15}$ are respectively formed at right ends of the upper wall 14, the rib R, and the lower wall 15, and respectively pass through the right ends of the upper wall 14, the rib R, and the lower wall 15 in the vehicle longitudinal direction. The through hole $H_{14}$, the through hole $H_R$, and the through hole $H_{15}$ are coaxially arranged. The through hole $H_{14}$, the through hole $H_R$, and the through hole $H_{15}$ are each formed on a front side (the vehicle cabin side) of a central section of the bumper reinforcement 10 in the vehicle longitudinal direction. In the plan view of the bumper reinforcement 10, the through hole $H_{14}$, the through hole $H_R$, and the through hole $H_{15}$ each have a rectangular shape that is elongated in the vehicle width direction. That is, a dimension of each of the through hole $H_{14}$, the through hole $H_R$, and the through hole $H_{15}$ in the vehicle width direction is longer than a dimension thereof in the vehicle longitudinal direction. Long sides of the through hole $H_{14}$, the through hole $H_R$, and the through hole $H_{15}$ are the same. Meanwhile, as shown in FIG. 3, short sides of the through hole $H_R$ and the through hole $H_{15}$ are slightly longer than short sides of the through hole $H_{14}$. That is, the through hole $H_R$ and the through hole $H_{15}$ are slightly larger than the through hole $H_{14}$.

A right end of the upper rear wall 12 is formed with a through hole $H_{121}$ that passes through the upper rear wall 12 in the vehicle longitudinal direction. A center axis of the through hole $H_{121}$ is orthogonal to center axes of the through hole $H_{14}$, the through hole $H_R$, and the through hole $H_{15}$. An inner diameter of the through hole $H_{121}$ is slightly larger than an outer diameter of a shaft section 31 of the towing hook 30, which will be described below.

A right end of the front wall 11 is formed with four through holes $H_{11}$ that pass through the front wall 11 in the vehicle longitudinal direction. An inner diameter of each of the through holes $H_{11}$ is slightly larger than an outer diameter of a bolt that is used to fix the bumper reinforcement 10 to each of the side members SR, SL. In addition, right ends of the upper rear wall 12 and the lower rear wall 13 are respectively formed with a through hole $H_{122}$ and a through hole $H_{13}$ that pass through the upper rear wall 12 and the lower rear wall 13 in the vehicle longitudinal direction. The through hole $H_{122}$ and the through hole $H_{13}$ are located behind the through holes $H_{11}$. The through hole $H_{122}$ and the through hole $H_{13}$ are each formed to have a larger inner diameter than the through hole $H_{11}$ such that a tool used to fasten the bolts for fixing the bumper reinforcement 10 can be inserted therein.

Figure 4:
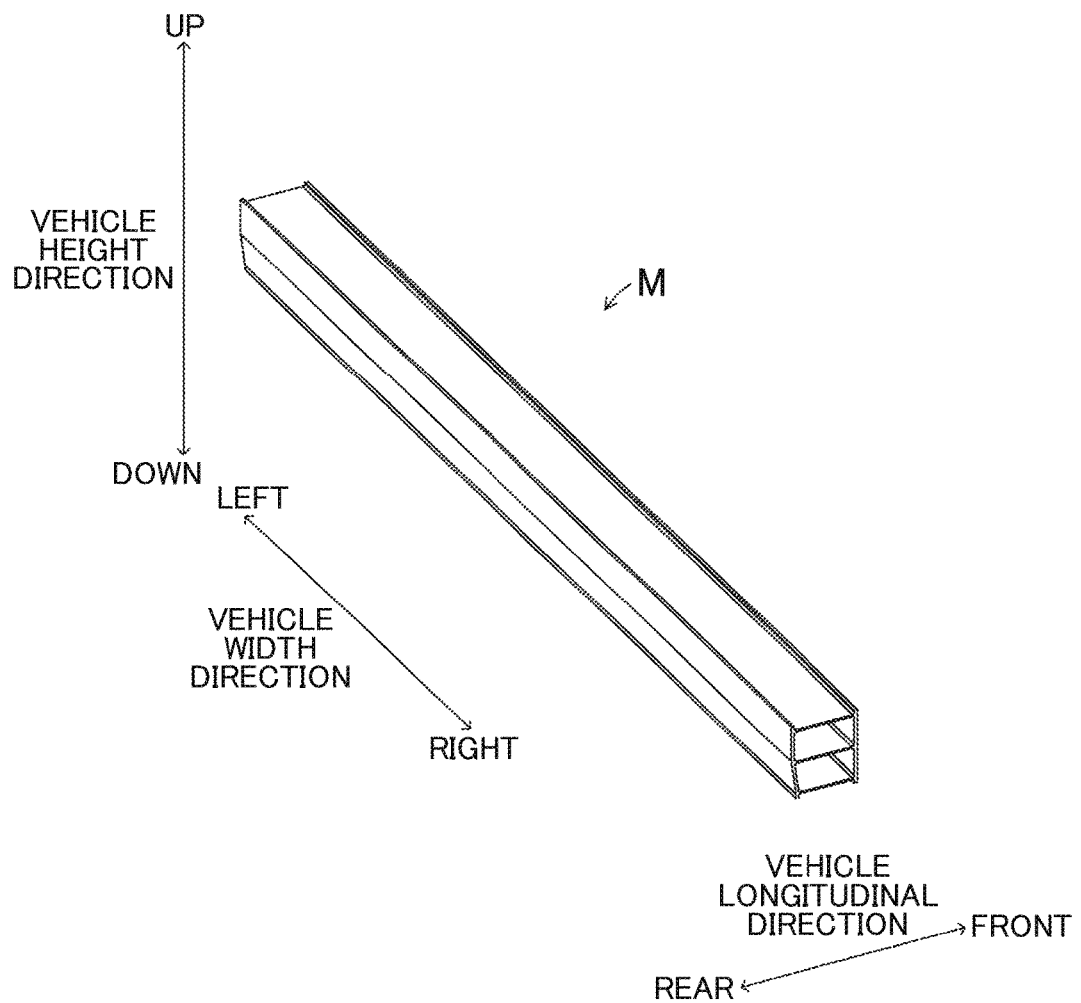
FIG. 4 is a perspective view of an intermediate molded body.

The bumper reinforcement 10 is integrally formed as will be described below. First, a metal material (for example, an aluminum material) is extruded to form an intermediate molded body M in a tubular shape that extends linearly as shown in FIG. 4. A cross section of this intermediate molded body M that is perpendicular to an extending direction thereof has the same shape as a cross section (FIG. 3) at the end of the bumper reinforcement 10 in the vehicle width direction. Note that an extruding direction of the metal material corresponds to the vehicle width direction. Next, in a state where both ends of the intermediate molded body M in the vehicle width direction are fixed, a central section of the intermediate molded body M in the vehicle width direction is pressed to the rear and curved. Then, the front wall 11, the upper rear wall 12, the lower rear wall 13, the upper wall 14, and the lower wall 15 are respectively formed with the through holes $H_{11}$, $H_{121}$, $H_{122}$, $H_{13}$, $H_{14}$, $H_{15}$. In this way, the bumper reinforcement 10 is formed.

The nut member 20 has: a body 21 that extends in the vehicle height direction; and a plate-shaped fringe 22 that is provided at an upper end of the body 21. A cross section of the body 21 that is perpendicular to the vehicle height direction has a rectangular shape that is elongated in the vehicle width direction. A dimension of the body 21 in the vehicle longitudinal direction is slightly smaller than the dimension of the through hole $H_{14}$ in the vehicle longitudinal direction. Long sides of an upper section (an upper side of a center in the vehicle height direction) of the body 21 are slightly shorter than the long sides of the through hole $H_{14}$. Long sides of a lower section (a lower side of the center in the vehicle height direction) of the body 21 are about half the length of the long sides of the upper section. However, long sides at a lower end of the body 21 are in approximately the same length as the long sides of the upper section. In addition, a dimension of the body 21 in the vehicle height direction is slightly larger than a dimension of the bumper reinforcement 10 in the vehicle height direction. A female screw 211 that extends in the vehicle longitudinal direction is formed in a portion that is located slightly above a central section of the body 21 in the vehicle height direction.

In a plan view of the nut member 20, the fringe 22 has a rectangular shape that is elongated in the vehicle width direction. Long sides of the fringe 22 are longer than the long sides of the upper section of the body 21. That is, the fringe 22 is bulged from the body 21 in the vehicle width direction. Meanwhile, short sides of the fringe 22 are in the same length as short sides of the body 21.

The nut member 20 is inserted in the through hole $H_{14}$, the through hole $H_R$, and the through hole $H_{15}$ from a position above the bumper reinforcement 10. In a state where the fringe 22 abuts against an upper surface of the upper wall 14, the lower end of the body 21 is located slightly below the lower wall 15. In this state, a slight clearance is provided between the front surface of the body 21 and an inner peripheral surface of the through hole $H_{14}$ (see FIG. 3). A relatively large clearance is formed between the front surface of the body 21 and an inner peripheral surface of each of the through hole $H_R$ and the through hole $H_{15}$. A slight clearance is provided between a rear surface of the body 21 and the inner peripheral surface of the through hole $H_{14}$. A relatively large clearance is formed between the rear surface of the body 21 and the inner peripheral surface of each of the through hole $H_R$ and the through hole $H_{15}$. A slight clearance is provided between a right surface of the body 21 and the inner peripheral surface of each of the through hole $H_{14}$, the through hole $H_R$, and the through hole $H_{15}$. In addition, a slight clearance is provided between a left surface of the body 21 and the inner peripheral surface of each of the through hole $H_{14}$, the through hole $H_R$, and the through hole $H_{15}$. A relatively large space is formed between the front surface of the body 21 and the front wall 11 of the bumper reinforcement 10. A relatively large space is formed between the rear surface of the body 21 and each of the upper rear wall 12 and the lower rear wall 13 of the bumper reinforcement 10. A peripheral edge of the fringe 22 is welded to the upper wall 14. In addition, a right surface and a left surface of the lower end of the body 21 are welded to the lower wall 15. In this state, the female screw 211 of the body 21 is in the middle of the upper wall 14 and the rib R, and the female screw 211 and the through hole $H_{121}$ are coaxially arranged.

The bumper reinforcement 10, to which the nut member 20 is welded, is placed at the rear of the side members SR, SL. Tips of the bolt and the tool are inserted in the bumper reinforcement 10 from the through holes $H_{122}$, $H_{13}$ of the bumper reinforcement 10. Then, the tip of the bolt is inserted in the through hole $H_{11}$ and is fastened to the rear wall of each of the side members SR, SL. In this way, the bumper reinforcement 10 is fixed to a body of the vehicle V.

The towing hook 30 has: the shaft section 31 that extends linearly; and a hook section 32 that is formed in a ring shape (see FIG. 2 and FIG. 3). The hook section 32 is provided at one end of the shaft section 31 in a longitudinal direction. A male screw 311 that can be fastened to the female screw 211 of the nut member 20 is formed at the other end of the shaft section 31 in the longitudinal direction. Length of the male screw 311 (length of the shaft section 31 in the longitudinal direction) is substantially the same as length of a short side of the body 21 in the nut member 20. A tip (the other end) of the shaft section 31 of the towing hook 30 is inserted in the through hole $H_{121}$ from behind the bumper reinforcement 10, and the male screw 311 is fastened to the female screw 211 of the nut member 20. In a state where the towing hook 30 is fastened to the nut member 20, the tip (the other end) of the shaft section 31 slightly protrudes from a front surface of the nut member 20.

As described above, in the state where the nut member 20 is fixed to the bumper reinforcement 10, an upper end and a lower end of the nut member 20 are more or less protrude upward and downward from the bumper reinforcement 10, respectively. However, the nut member 20 does not protrude to the front from the bumper reinforcement 10. Then, when the male screw 311 of the towing hook 30 is fastened to the female screw 211 of the nut member 20, the tip of the shaft section 31 of the towing hook 30 is located in the bumper reinforcement 10. That is, the towing hook 30 does not protrude to the front from a front surface of the bumper reinforcement 10. Accordingly, the front surface at each of the ends of the bumper reinforcement 10 in the vehicle width direction can be set in a planar shape, and a recess, a hole, or the like that is used to avoid the nut member 20 and the towing hook 30 does not have to be provided in the rear wall of each of the side members SR, SL. In addition, an attachment position of the towing hook 30 can be set without imposing restriction on positions of the side members SR, SL. Just as described, according to the towing hook attachment structure 1, freedom in design of the vehicle V can be improved.

Like the towing hook attachment structure disclosed in Japanese Patent No. 4229388, in the cases where the nut member 20 extends in the vehicle longitudinal direction and the nut member 20 is supported by the front wall 11 and the upper rear wall 12 (or the lower rear wall 13), a towing load (a load in the vehicle longitudinal direction that is applied to the towing hook 30) is directly applied to the front wall 11 and the upper rear wall 12 (or the lower rear wall 13) and is applied to the upper wall 14 and the lower wall 15 via the front wall 11 and the upper rear wall 12 (or the lower rear wall 13). In this case, the upper wall 14 and the lower wall 15 function as ribs of the front wall 11 and the upper rear wall 12 (or the lower rear wall 13). However, the front wall 11 is possibly deformed before the upper wall 14 and the lower wall 15 are deformed due to the excess towing load. On the contrary, in this embodiment, because the nut member 20 is supported by the upper wall 14 and the lower wall 15, the towing load is directly applied to the upper wall 14 and the lower wall 15. Thus, according to this embodiment, compared to the towing hook attachment structure disclosed in Japanese Patent No. 4229388, a maximum towing load can be set to be large.

In addition, the bumper reinforcement 10 has a function of being compressed and deformed in the vehicle longitudinal direction by a shock load during a collision and absorbing a shock by the collision. Here, like Japanese Patent No. 4229388, in the cases where the nut member 20 extends in the vehicle longitudinal direction and the front end and the rear end thereof are respectively fixed to the front wall 11 and the upper rear wall 12 (or the lower rear wall 13), rigidity of a portion provided with the nut member 20 against a rear collision is higher than rigidity of the other portions. Accordingly, when an object collides with the vehicle V from the rear, deformation of the portion provided with the nut member 20 is suppressed, and thus the shock cannot efficiently be absorbed. On the contrary, in this embodiment, portions of the bumper reinforcement 10 in front of and behind the nut member 20 are formed with the spaces. Accordingly, when the object collides with the vehicle V from the rear, the portions of the bumper reinforcement 10 in front of and behind the nut member 20 are compressed and deformed. In this way, the shock by the collision is absorbed.

When the load in the vehicle height direction or the vehicle width direction is applied to the towing hook 30 in the state where the towing hook 30 is fastened to the nut member 20, the towing hook 30 oscillates more or less in a direction of the load. When the shaft section 31 of the towing hook 30 abuts against the inner peripheral surface of the through hole $H_{121}$, oscillation of the towing hook 30 is restricted. In this embodiment, the nut member 20 is arranged on the front side (the vehicle cabin side) of the central section of the bumper reinforcement 10 in the vehicle longitudinal direction. Accordingly, in the state where the towing hook 30 is fastened to the nut member 20, a distance between the nut member 20, which supports the towing hook 30, and the through hole $H_{121}$ is relatively long. Thus, compared to a case where the nut member 20 is arranged at a position near the upper rear wall 12, an oscillation angle of the towing hook 30 in a state where the oscillation thereof is restricted is small.

Note that the position of the nut member 20 in the vehicle longitudinal direction may be set in accordance with a distance between the bumper reinforcement 10 and the bumper cover. For example, in a vehicle type with the relatively long distance, the nut member 20 is set at a slightly front position from the position in the above embodiment. Meanwhile, in a vehicle type with the relatively short distance, the nut member 20 is set at a slightly rear position from the position in the above embodiment. According to this, even when the same towing hook 30 is adopted as a common part for the plural vehicle types with the different distances, a protrusion amount of the towing hook 30 from the bumper cover can be set to be the same for the plural vehicle types.

The through hole $H_R$ and the through hole $H_{15}$ are slightly larger than the through hole $H_{14}$. Accordingly, even in the case where the nut member 20 is slightly inclined after the nut member 20 is inserted in the through hole $H_{14}$, the nut member 20 can relatively easily be inserted in the through hole $H_R$ and the through hole $H_{15}$.

Furthermore, the disclosure is not limited to the above embodiment, and various changes can be made thereto without departing from the purpose of the disclosure.

For example, the bumper reinforcement 10 is formed in the tubular shape in the above embodiment. However, the central section of the front wall 11 in the vehicle height direction may be opened to the vehicle cabin side. In addition, the nut member 20 is welded to the bumper reinforcement 10 in the above embodiment. However, a fixing method of the nut member 20 is not limited to that in the above embodiment. For example, the nut member 20 may be fastened to the bumper reinforcement 10 by a fastening member.

What is claimed is:

1. A towing hook attachment structure comprising:
    a towing hook of a vehicle;
    a bumper reinforcement having: a first wall that is disposed in front of or behind a vehicle cabin and extends in a vehicle width direction, a wall surface of the first wall facing the vehicle cabin; and a second wall and a third wall that respectively extend to the vehicle cabin side from an upper end and a lower end of the first wall; and
    a nut member that fastens the towing hook to the bumper reinforcement, wherein
    the first wall, the second wall, and the third wall are respectively provided with a first through hole, a second through hole, and a third through hole,
    the nut member is fixed to the bumper reinforcement while extending in a vehicle height direction and being inserted in the second through hole and the third through hole, and
    a tip of the towing hook is inserted in the bumper reinforcement through the first through hole and is fastened to the nut member.

2. The towing hook attachment structure according to claim 1, wherein
    the third through hole is larger than the second through hole, and
    the nut member is inserted in the second through hole from a position above the second wall and is fixed to the bumper reinforcement in a state where a tip of the nut member protrudes from the third through hole.

3. The towing hook attachment structure according to claim 1, wherein
    an upper end and a lower end of the nut member are respectively welded to the second wall and the third wall.

4. The towing hook attachment structure according to claim 1, wherein
    the nut member is arranged at an end of the bumper reinforcement on the vehicle cabin side.

5. The towing hook attachment structure according to claim 4, wherein
    the second through hole and the third through hole are arranged on the bumper reinforcement at positions closer to the vehicle cabin than a central section of the bumper reinforcement in a vehicle longitudinal direction is.

6. The towing hook attachment structure according to claim 1, wherein
    the bumper reinforcement has a tubular shape.

* * * * *